Dec. 3, 1968
S. A. PLATT
3,414,351
COMBINED AND CORRELATED FILMSTRIP LOOP AND
SOUND LOOP APPARATUS
Filed March 10, 1966
4 Sheets-Sheet 1
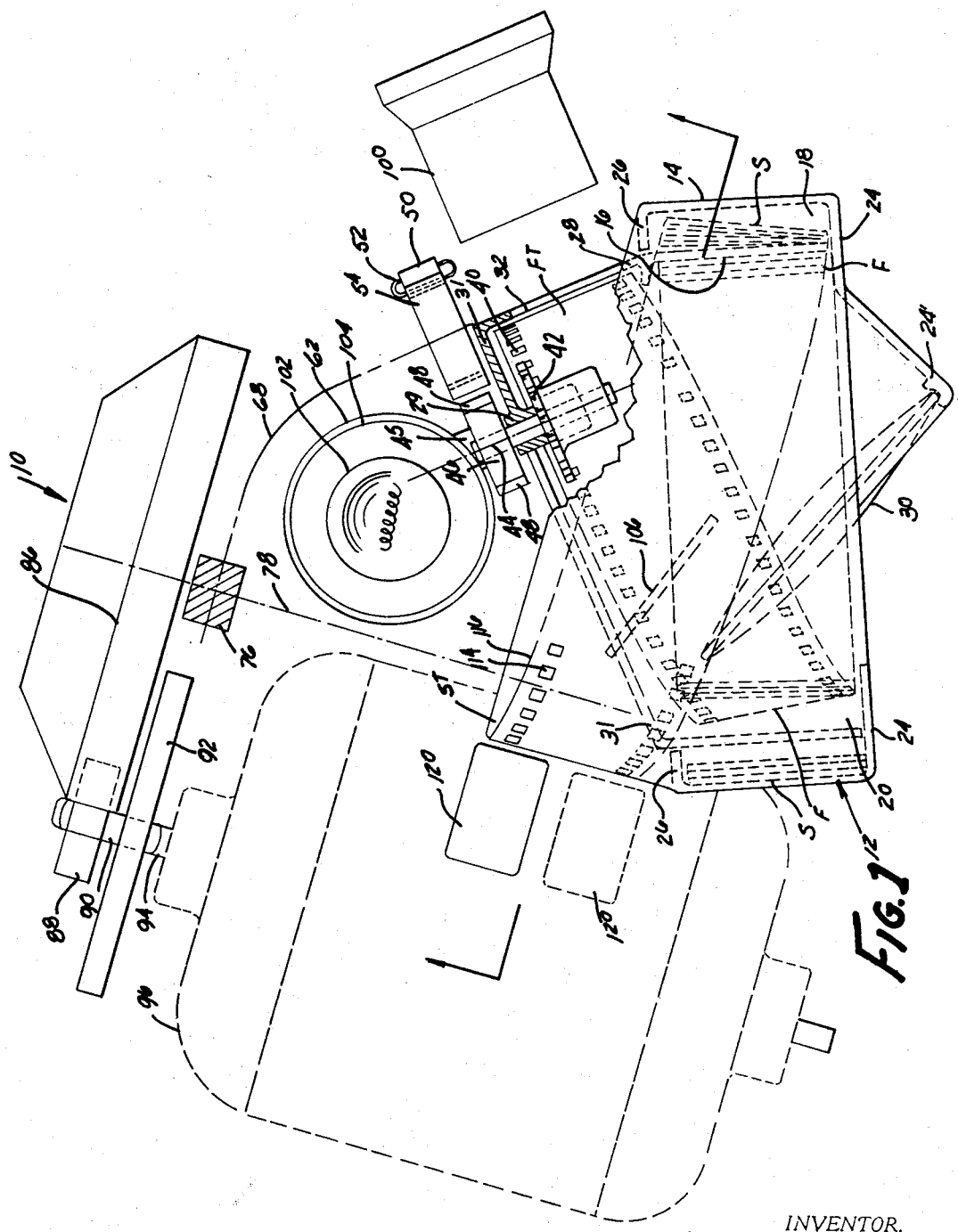
INVENTOR.
STEPHEN A. PLATT
BY *Price & Heneveld*
ATTORNEYS

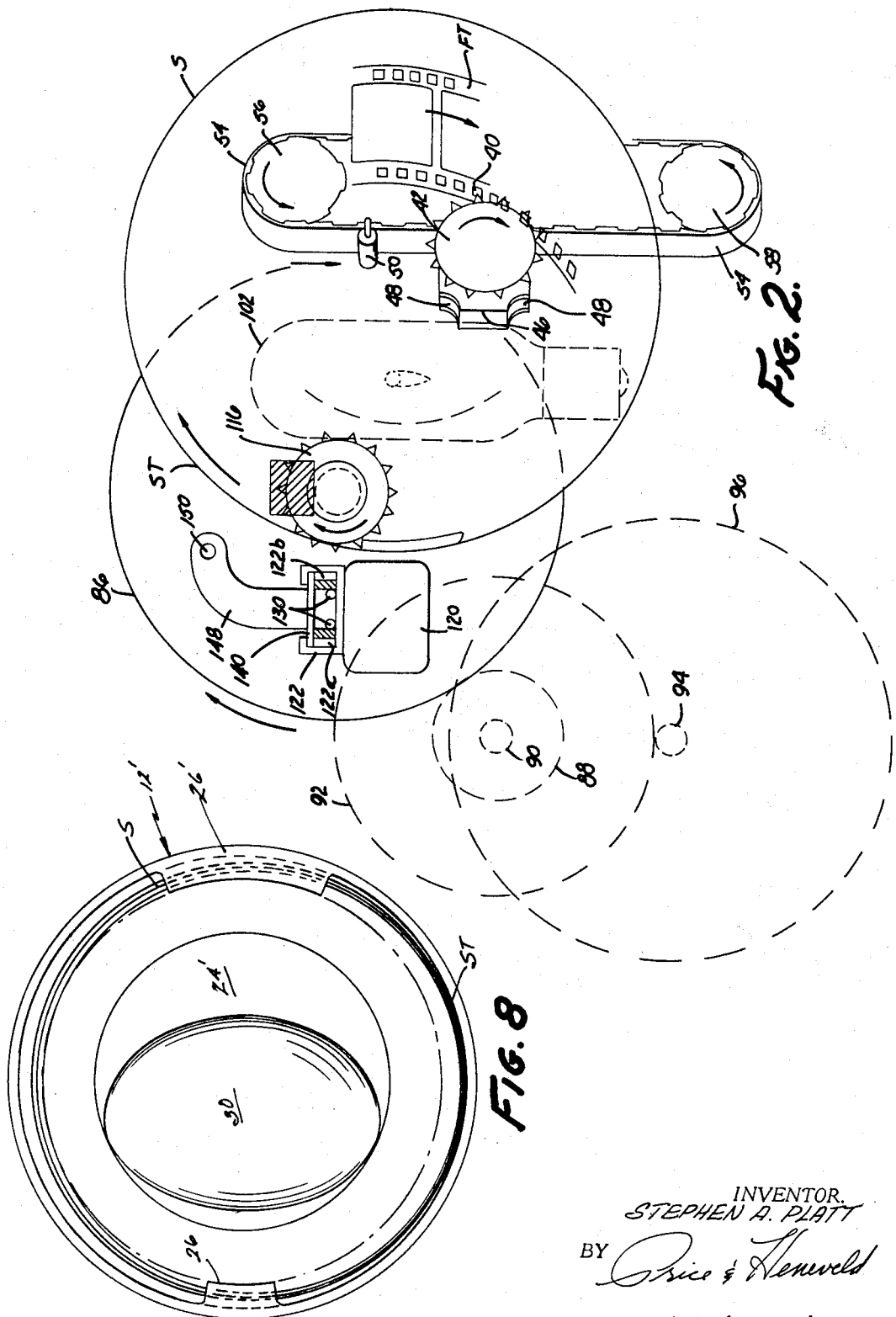

Dec. 3, 1968
S. A. PLATT
3,414,351
COMBINED AND CORRELATED FILMSTRIP LOOP AND
SOUND LOOP APPARATUS
Filed March 10, 1966
4 Sheets-Sheet 3
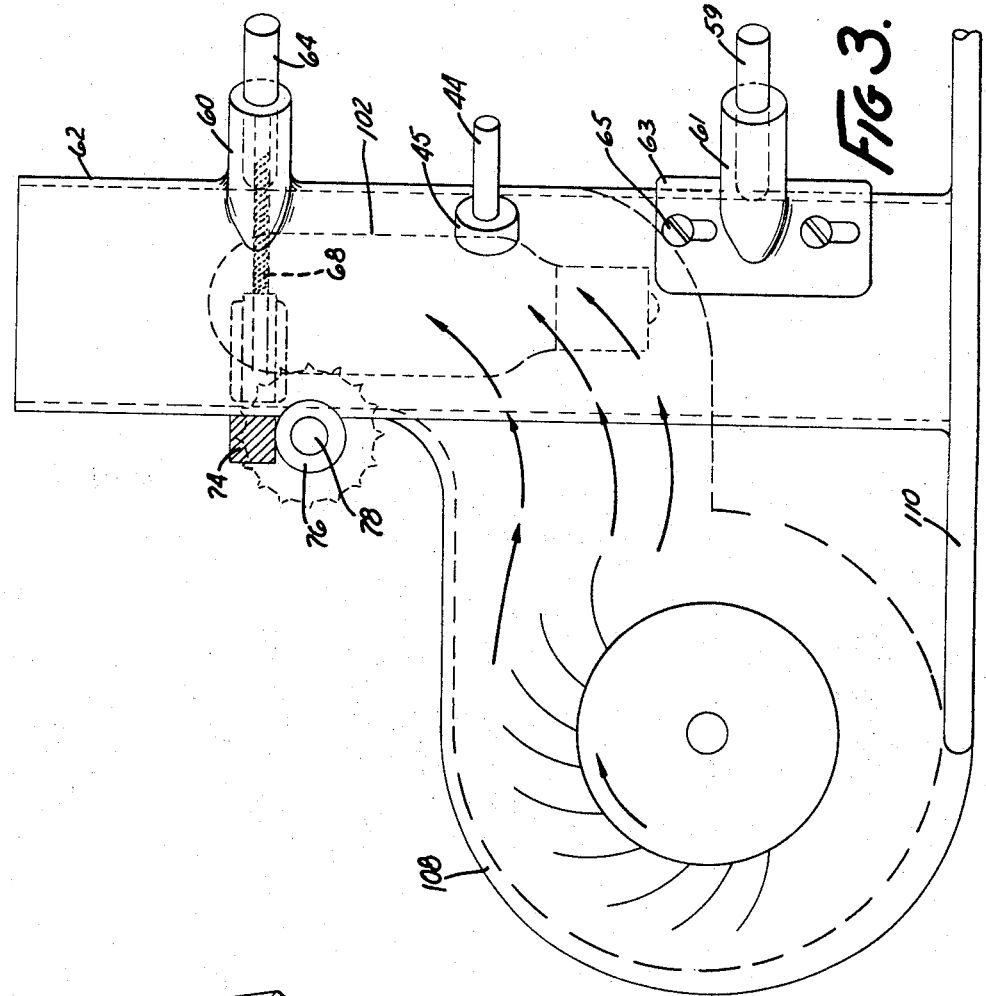
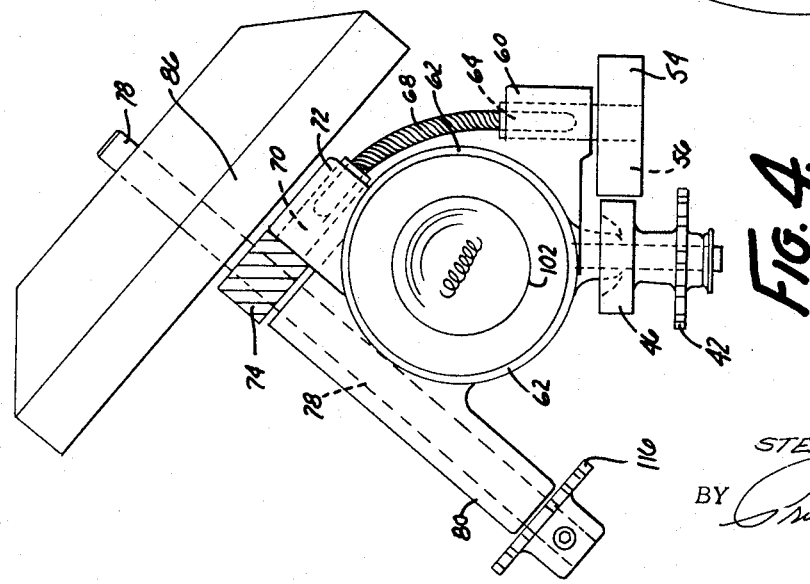
INVENTOR.
STEPHEN A. PLATT
BY
ATTORNEYS

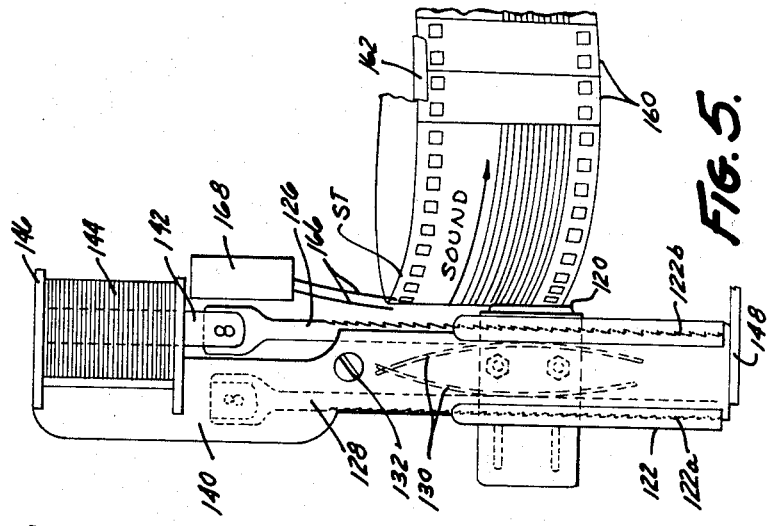
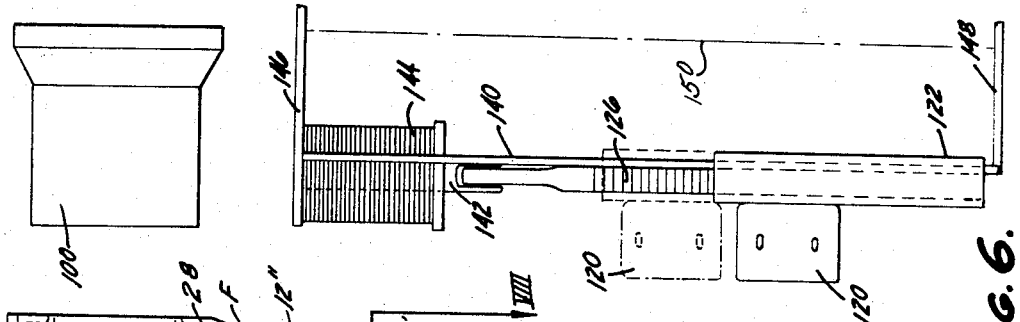
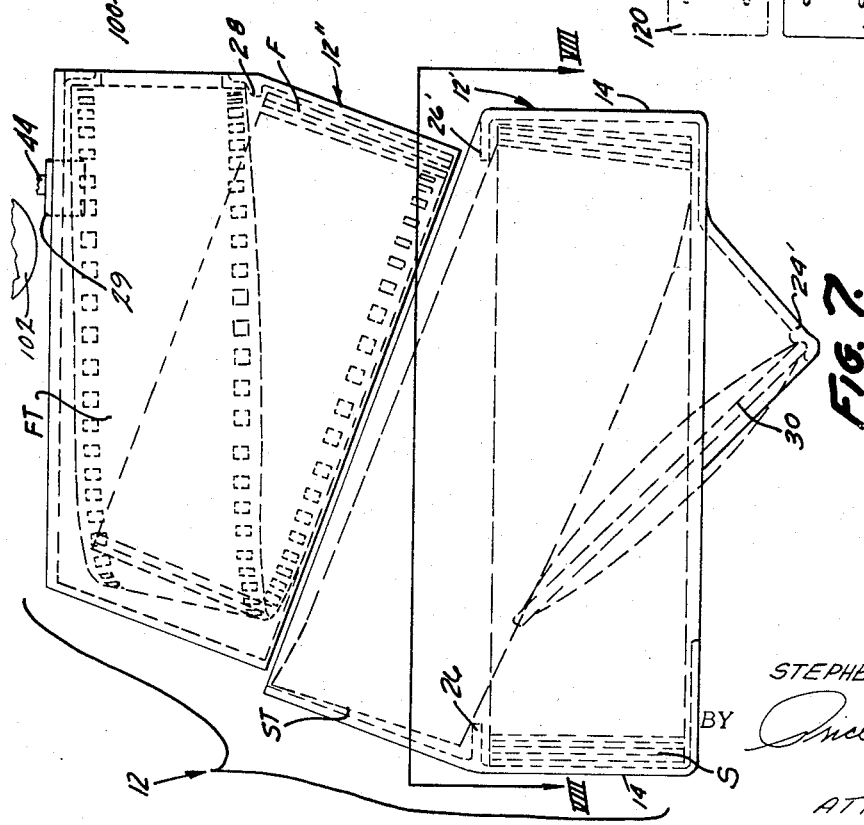

United States Patent Office 3,414,351
Patented Dec. 3, 1968

3,414,351
COMBINED AND CORRELATED FILMSTRIP LOOP AND SOUND LOOP APPARATUS
Stephen A. Platt, 1100 Fulton St.,
Grand Haven, Mich. 49417
Filed Mar. 10, 1966, Ser. No. 533,215
11 Claims. (Cl. 353—15)

This invention relates to apparatus for handling a circular continuous loop of filmstrip and a circular continuous film of sound strip, and particularly to apparatus having the filmstrip within the free space of the sound strip, within a cartridge common to both, while achieving positive mechanical synchronized cooperative advancing relationship between the optical and sound loops.

The value of using photographic slides in programs of education, entertainment, advertising and so forth is frequently increased by the simultaneous use of a sound track reproduction system. The correlation between the two independent video and audio apparatuses is presently done either by having the person operating the slide film personally time his film advancement with respect to the reproduction of the sound strip, to correlate them, or sometimes by electronic synchronization. The first method requires skill and knowledge of the subject matter on part of the operator. The second method involves a complex expensive, bulky set-up which is economically feasible only in unusual circumstances.

The invention herein uniquely enables individual photographic frames to be automatically correlated with a sound strip, employing the frames in the form of a filmstrip, in a continuous circular loop, and employing the sound strip in the form of a continuous circular loop, one within the other.

Basically, filmstrip is known in the trade as a strip of interconnected photographic slides having a width of about two to four times that of conventional 8 millimeter or 16 millimeter motion picture film, and having a length measured in inches rather than feet.

Although "moving picture film" is handled in a continuous loop form, projected by pulling one turn of the loop constantly out into a temporary ovular, or other noncircular configuration beyond the loop, this type of distortion of wide short "filmstrip" causes a severe frictional drag between turns of the filmstrip, and distortion of the entire loop. These factors have prevented a continuous loop of filmstrip from being employed in a practical manner heretofore. Further, to the knowledge of the inventor herein, no one has been able to effect a truly successful marriage of filmstrip continuous loops and sound strip continuous loops at all, heretofore.

It is an object of this invention to provide a unique apparatus for handling and synchronizing the advance of filmstrip and a corresponding sound strip both in the form of continuous loops.

Another object of this invention is to provide a novel cartridge unit having capacity for retention and advancement of both a continuous filmstrip and a continuous sound strip in the same cartiridge, and enabling both optical viewing of the filmstrip and audio reproduction of the sound strip while in the cartridge.

Another object of this invention is to provide a cartridge assembly for a continuous filmstrip and a continuous sound strip, having the facility for operating both the filmstrip and the sound strip in interlocked synchronized relationship, with the sound strip being continually advanced, and the filmstrip being intermittently advanced, both from the same drive assembly, in exactly controlled fashion, while maintaining both in the form of a circular configuration in all of the turns of the loops, even the individual turns on each loop which are partially segregated from the remaining turns for viewing and sound reproduction.

Another object of this invention is to provide a continuous filmstrip and continuous sound strip viewing and audio reproduction assembly achieving synchronized advancement of the two strips, and having advancement of the reproduction head from one sound track to the next on the sound strip controlled by the splice forming the connection between the ends of the continuous sound strip loop.

Another object of this invention is to provide unique apparatus for cooperative operation of a filmstrip and a sound strip, both in the form of continuous circular loops, and one located inside the other for compact positioning, yet each having one individual turn of the continuous loop constantly singulated from the remaining turns of the loops, but without distortion of the singulated turns from the circular configurations. Moreover, both continuous loops are freestanding, without inside loop support.

Another object of this invention is to provide apparatus for simultaneously viewing a continuous filmstrip, and listening to a continuous sound strip, with the filmstrip being viewed either by direct viewing or by projection viewing means, and wherein the projection viewing means forms part of the structural support means for the apparatus.

These and other objects of this invention will become apparent upon studying the following specification in conjunction with the drawings in which:

FIG. 1 is a plan view of the novel apparatus;

FIG. 2 is an elevational, partially schematic view of the novel apparatus;

FIG. 3 is a fragmentary, enlarged, elevational view of certain components of the assembly;

FIG. 4 is a fragmentry plan view of a portion of the support and drive system of this assembly;

FIG. 5 is a front elevational view of the sound head advancing assembly;

FIG. 6 is a side elevational view of the sound head advancing subassembly in FIG. 5;

FIG. 7 is an exploded side view of the cooperative cartridge housing components for the filmstrip (upper) and sound strip (lower); and FIG. 8 is a sectional plan view of the sound strip housing portion in FIG. 7, taken on plane VIII—VIII.

The assembly 10 basically centers around a cartridge housing subassembly 12 that supports and retains a multiple turn, freestanding, circular, continuous loop of filmstrip F and a multiple turn, freestanding, circular, continuous loop of sound strip S. The constant circular configuration of all turns in the loops is significant. The inventor herein, having found that continuous filmstrip works remarkably well if permitted and caused to remain in a circular configuration and that such circular strip requires no inner support, and having found that a continuous sound strip works remarkably well if permitted and caused to remain in a circular configuration then determined that the filmstrip loop can occupy the space within the sound strip loop, and both can be in the same cartridge. Utilizing these principles the inventor invented a unique apparatus to project sight and sound from both simultaneously while so arranged.

Cartridge subassembly 12 is basically circular in configuration, including an outer sound strip housing 12' and an inner filmstrip housing 12" (FIG. 7). Outer housing 12' has a circular outer peripheral retaining wall 14, surrounding and spaced from a smaller diameter, circular wall 16 of housing 12", to define a space 18 for sound strip loop S, therebetween. Within inner wall 16 is an annular space 20 for filmstrip F, so that the axis of the divergent portion is at an acute angle to that of the remaining portion, but of the same diameter, and forming a circle or annulus at the acute angle to the circle or annulus of the remaining housing portion. Thus, as will be understood, one turn of the continuous sound strip loop can be diverged in a circular form for temporary segregation thereof, and one turn of the continuous filmstrip loop can be diverged in a circular form for temporary segregation thereof. Housing 12' also includes an arcuate ledge 26 in the center of its double side for supporting the separated turn of the sound strip loop. Housing 12'' includes an arcuate ledge 28 in the center of its double side for supporting the separated turn of the filmstrip. Opposite ledge 26 is an arcuate flange 26' which cooperates with ledge 26 to retain all turns but the separated turn in the main part of housing 12'.

One portion of flange 24 is extended radially further in toward the axial center of the cylindrical cartridge, and protrudes axially outwardly at 24' to form a mount for a direct viewing magnifying lens 30. This lens is located on a diagonal with respect to the axis about which the circular filmstrip and sound strip loops center, so that it will align with an opening 32 formed in the double part of housing 12'', and with the separated turn FT of filmstrip adjacent the opening. Housing 12'' forms a main circular, filmstrip track therefore, and a separated circular filmstrip track that diverges with respect to the main filmstrip track. This one turn FT of filmstrip retains its circular configuration, and actually extends between the innermost turn and the outermost turn of the continuous filmstrip loop.

Housing 12'' has an end coplanar portion 31 which is generally annular in configuration, with a central opening for extension of turn ST therefrom (FIG. 1).

Engaging this turn, and specifically the notches 40 therein, is a rotational sprocket 42 having a hub mounted on rotational shaft 44 which extends through a support bearing 29 on one side of housing portion 31. Shaft 44 is supported in an integral sleeve 45 on chimney column 62 (FIGS. 1 and 3). On the opposite end of shaft 44, outside the housing, is a rotational intermittent drive element 46 which is preferably square in configuration, and having grooves 48 in its corners (FIG. 2). These grooves intermittently receive and are drivingly engaged by a lug 50 attached by clip 52 to a timing belt 54 that is driven around a pair of sprockets 56 and 58, to form a type of Geneva drive. Sprocket 56 is rotationally-mounted to a boss 60 integrally secured to the outer periphery of lamp chimney 62 (FIG. 4). Drivingly connected to shaft 64 of sprocket 56 is a flexible cable 68 which extends around an arcuate portion of chimney 62 to engage a shaft 70 rotationally mounted in a boss 72, also integrally secured to chimney 62. Mounted on shaft 70 is a helical gear 74 which meshes with a second helical gear 76 (FIG. 3) mounted on a shaft 78. Shaft 78 is rotationally supported in an elongated sleeve 80, also integrally secured to chimney 62. Mounted on shaft 78 to rotate therewith is a sound fly wheel 86 having a friction periphery drivingly engaged with a friction wheel 88 on shaft 90 (FIGS. 1 and 2).

On this shaft is another friction wheel 92 which peripherally engages with the output shaft 94 of a drive motor 96. Thus, operation of motor 96 causes intermittent advancement of turn FT of the filmstrip loop, and thus intermittent advancement of the entire freestanding multi-turn filmstrip loop in an endless fashion by shaft 94 of motor 96 turning friction wheel 92, to turn shaft 90, to turn friction wheel 88, to turn sound fly wheel 86, to turn shaft 78, to turn helical gear 76, to turn helical gear 74, and thus shaft 72, to turn flexible shaft 68, and thus shaft 64, to turn sprocket 56 for advancing continuously timing belt 54 and thus lug 50. Intermittent engagement of lug 50 with one of the grooves 48 of rotational rotor 46 causes the rotor to be intermittently advanced as the lug passes, to intermittently rotate sprocket 42 and thus intermittently advance the separated turn FT of filmstrip F. The tightness of the timing belt 54 may be adjusted by shifting lower sprocket 58 which is mounted on a rotational shaft 59, in turn secured to a collar 61 on plate 63. This plate is attached by screws 65 to chimney 62, to be adjustably movable for loosening and tightening timing belt 54.

The direct viewing or magnifying lens 30 is on one side of filmstrip portion FT, and light inlet orifice 32 in the housing is on the second side, so that these optical elements straddle the filmstrip turn. Alternatively, the filmstrip may be viewed by projection techniques, utilizing a projections lens subasssembly 100 which is adjacent opening 32 outside the housing, in combination with a light source or lamp 102 in elongated cylindrical chimney 62. The lamp is aligned, through an opening 104 in the chimney, with a reflecting mirror 106 that extends inside the filmstrip loop, to reflect the light from lamp 102 through filmstrip turn FT and opening 32 into the projection lens, for projection on an external screen (not shown). Thus, it will be seen the optical viewing means in either form includes lens means and means for increasing the light intensity on the filmstrip. In other words, the means of increasing light intensity on the filmstrip can either be a direct light source like lamp 102, or merely light inlet means like opening 32. Also, the lens means can be either a direct viewing lens, e.g. lens 30, or a projection lens 100.

The diametral planes of the second annular housing track means for one separated turn are at a small acute angle to the diametral planes of the first annular support track housing means, for the remaining turns. The space inside the filmstrip loop, both within the single turn FT and within the remaining turns is free, so that the filmstrip is self-supporting as well as circular.

Cooling of lamp 102 is preferably obtained by a blower 108 mounted to be driven on the output shaft of motor 96, and having its outlet into the lower end of chimney 62 (FIG. 3), for causing a continual flow of air over lamp 102. This blower may be mounted on the main base 110 upon which the chimney 62 is also supported.

As noted previously, the continuous loop S of the sound strip also is in a circular configuration, surrounding the filmstrip F, with all but one turn being in the first annular track means 18 and the last turn of sound strip ST (FIG. 1) being divergent at a small acute angle with respect to the remaining track, and supported above ledge 26 to be temporarily segregated. This turn is the connection between the innermost turn and the outermost turn of the sound strip multiple turn continuous loop S. The individual segregated circular turns FT of filmstrip and ST of sound strip therefore crisscross each other as shown in FIG. 1. Associated operably with the segregated turn ST of the sound strip is driving means and sound head pick-up means 120 for sound reproduction. More specifically, engaging notches 114 of turn ST of the sound strip loop is a sprocket 116 mounted on the opposite end of shaft 78 from the sound fly wheel 86 (FIG. 4). Thus driving of sound fly wheel 86 causes constant driving of sprocket 116 and thus of the sound strip loop. This drive connection is completely solid and rigid, enabling the sound drive mechanism to operate without jumping or sound distortion. Obviously therefore, the sound advancement is operably synchronized with the intermittent filmstrip advancement since both are driven off the same drive motor and drive assembly through branch drive train. Supported adjacent the single turn FT of singulated continuous sound strip is the magnetic sound head 120. This sound head may be of the conventional type magnetic sound head, to convert the recorded signals on the tape to electronic signals and thus to sound signals. The head itself is mounted on an elongated sleeve 122 (FIGS. 2, 5 and 6). This sleeve 122 can be controllably shifted transversely of the sound loop to advance the sound head 120 step by step, transversely across the sound loop (as shown in phantom lines in FIGS. 1 and 6) to move from one sound track to the next of the multiple tracks normally on the strip. This advancing is preferably done with a controlled ratchet advance mechanism.

More specifically, on the inner surfaces of the two parallel legs of the generally U-shaped collar or sleeve 122 are teeth 122a and 122b (FIG. 2) which respectively engage a ratchet type elongated position rack 128 and a ratchet type pull rack 126. The ratchet teeth are positioned on opposite sides of these two elongated members 126 and 128, with these members being biased apart into engagement with the teeth 122a and 122b by a spring 130 having a pair of spaced legs, and mounted at one end on a screw 132 which is attached to member 122. The position rack 128 has one end pivotally attached to the mounting plate 140. The pull rack has one end pivotally attached to armature 142 of a reciprocal shifting solenoid 144. Solenoid 144 is mounted to a swinging arm 146. The plate 140 extends between this swinging arm 146 and a like swinging arm 148. Collar 122 is also slidably movable along plate 140. Thus, this entire sound head assembly is pivotally supported as a framework by arms 146 and 148, since both pivot arms are mounted on a pivot axis 150 to the assembly. This enables the magnetic head to be moved out of engagement with the sound strip.

Actuation of solenoid 144 causes pull rack 126 to shift approximately 0.050 inch to advance collar 122 and thus sound head 120 this much, for movement from one sound track to the adjacent sound track on the sound strip. Sleeve 122 supporting the sound head does not shift back on the return movement of rack 126, since it is then held in position by position rack 128.

Since the sound strip is composed of a large number of adjacent sound tracks, and since each sound track extends the entire length of the continuous sound strip loop, the invention makes use of the splice 160 (FIG. 5) which connects the ends of the sound strip to form the continuous loop. More specifically, an electrical conductive element or spot 162 is deposited or attached to splice 160 so that, at this position a signal can be conducted through element 162 to the solenoid 144 to shift sound head 120 to the next adjacent sound track. The shift is made at this splice since the sound track is discontinuous over the splice, with the shift thereby causing no distortion of the sound. The conductive means 162 actually cooperates with a pair of electrically conductive strip straddling feelers 166 (FIG. 5), with these feelers forming a portion of an electrical switch 168 operably associated wth solenoid 144. Thus, as the splice of the continuous sound strip loop passes between the feelers 166, a circuit is completed through the switch 168 to pass a temporary signal to solenoid 144, thereby actuating the solenoid to shift pull rack 126 and move sound head 120 to the next sound track on the sound strip loop. The sound head would then be in operative association with that particular sound track until the entire length of the multiple turn sound strip loop pass, and then would be shifted to the next sound track. This conductive element therefore serves as signaling means on the splice of the sound strip, while the switch and its feelers comprises a signal detecting trigger means for the sound head shifting or advancing means.

OPERATION

This unique apparatus is initially intended to be employed for education purposes since, for the first time, it combines in a unique practical manner a continuous filmstrip loop and continuous sound strip loop, obtaining synchronized driving relationship without complex expensive equipment, and without special skill or knowledge on the part of the operator. It could be employed for many other purposes in addition to education, e.g. for advertising, entertainment, and so forth. Since the equipment has found to be so inexpensive when fabricated, it may be desirable to employ a separate cartridge for each pair of sound strip and filmstrip loops thus, a library of cataloged audio-visual cartridges could be employed to great advantage. A cartridge could be selected and operated with no particular skill. All that needs to be done to enable viewing of the individual photographic frames and listening to the correlated sound system would be to start drive motor 96.

More specifically, by operating drive motor 96, its output shaft 94 drives the friction wheel 92 on shaft 90, to therefore drive frictional wheel 88 which engages the sound fly wheel 86. The fly wheel enables the sound track drive to be constant, thereby preventing sound distortion. Operation of fly wheel 86 drives shaft 78 to drive sound sprocket 116 and thereby continuously advance the separated portion ST of the endless circular freestanding sound strip loop S. Simultaneously, portion FT of continuous circular filmstrip loop F is intermittently advanced from frame to frame at time intervals because of the drive connection to the timing belt system and the resulting intermittent drive of advancing sprocket 42. By causing the length of the sound strip loop and the filmstrip loop to be in a definite relationship, the entire sound strip including its several sound tracks, will be completed at the same time that the filmstrip loop is completed. Of course, the sound strip loop will make several revolutions to one revolution of the filmstrip since the sound strip has several sound tracks on it. As each revolution of the sound strip occurs, splice 160 (FIG. 5) and its conductive portion 162 passes the triggering switch feelers 166 to actuate solenoid 144 and shift the sound head 120 to the adjacent sound track. Normally the sound strip is of the same length as the filmstrip, but this can be varied.

The filmstrip can be either directly viewed, utilizing the optical means composed of light inlet 32 and direct magnifying lens 30, or can be projected, utilizing light source 102 with its reflective mirror 106, and the projection lens 100 on the opposite side of the filmstrip. Adjacent opening 32 then serves as a light passage means in the opposite direction.

It will be realized that in some instances only the direct viewing optical means or only the projection viewing optical means may be employed on a particular cartridge rather than both as shown in the apparatus.

Obviously, any type of subject matter can be readily adapted to this system, so that the device can be used for collegiate education levels, or alternatively, for informing or educating the completely uneducated. The only skill that the operator need have is the ability to turn the motor "on" and "off." The potential for this apparatus therefore in libraries, or in backward countries, or for health education on the good ship *Hope,* for advertising purposes, for sales training, etc. is very extensive. The apparatus is extremely compact, enabling an entire series thereof to be readily stored as on library shelves. It can be relatively inexpensively manufactured, and is composed of relatively durable operative and structural components. Its preferred illustrated design enbales support of all components on the single base and upstanding cooling chimney.

These and several other advantages not specifically listed herein will occur to those in the art upon studying the foregoing illustrative forms of the invention, the foregoing description, and the concept behind them. It is also conceivable that certain deviations in structure to suit particular type of usage may be made without departing from the unique concept presented. Hence, the invention is intended to be limited only by the scope of the appended claims and the reasonably equivalent structures to those defined therein.

I claim:

1. Apparatus for synchronized optical showing of photographic frames on a continuous filmstrip loop and audio production from a continuous sound strip loop comprising: a filmstrip and sound strip cartridge; said cartridge comprising a first filmstrip housing portion having a first circular filmstrip track means for retaining all but one turn of a circular continuous filmstrip loop, and a second circular filmstrip track means divergent from said first filmstrip track means for retaining said one turn in a separated circular condition; optical viewing apparatus adjacent a portion of said second filmstrip track means for viewing of frames in said one circular turn; said cartridge further comprising a second sound strip housing portion cooperatively associated with respect to said first housing portion, and having a first circular sound strip track means for retaining all but one turn of a continuous circular sound strip loop, and a second circular sound strip loop, and a second circular sound strip track means divergent from said first sound strip track means for retaining said one turn of said sound strip loop in a separated circular condition; audio sound head pick-up means adjacent a portion of said second sound strip track for cooperation with said one circular turn of sound strip; and operatively interconnected filmstrip and sound strip advancing means for synchronized advancement thereof.

2. The apparatus in claim 1 wherein: said advancing means correlated continuous sound strip advancing means and intermittent filmstrip advancing means; and said apparatus includes laterally shifting sound head shifting means for regulated cooperation with adjacent portions of sound track on said sound strip.

3. The apparatus in claim 2 including in combination therewith a continuous, multiple turn sound strip loop having signaling means thereon, and signal detecting trigger means operably positioned at said second sound track means and operably associated with said sound head shifting means to periodically trigger said sound head shifting means.

4. The appartus in claim 3 wherein said signal detecting trigger means is an electrical switch positioned to engage said signaling means.

5. The apparatus in claim 4 wherein said continuous sound strip loop has a splice, and said signaling means is at said splice to trigger shifting of said sound head thereat, for preventing sound distortion with shifting of said sound head means.

6. The apparatus in claim 5 wherein said signaling means is an electrically conductive element, and said electrical switch includes a pair of spaced strip straddling conductive feelers cooperable with said element to temporarily complete a circuit for signaling said shifting means.

7. The apparatus in claim 3 wherein said sound head shifting means includes a ratchet support operably connected to said sound head means, and power shifting means operably connected to said ratchet support.

8. The apparatus in claim 1 wherein one of said first circular track means is located within the other of said first circular track means to cause one continuous loop to be within the other continuous loop.

9. The apparatus in claim 1 wherein said first and second filmstrip track means form free space therewithin and said optical viewing means includes portions protruding into said free space.

10. The apparatus in claim 2 wherein said advancing means includes a drive motor, and both said sound strip advancing means and said filmstrip advancing means are operably connected to said drive motor for synchronized respective continuous and intermittent advancement thereof.

11. The apparatus in claim 2 wherein said intermittent filmstrip advancing means includes a constantly driven recirculating timing belt having lug means thereon, a rotationally mounted rotor having spaced lug engaging means around its preiphery, to be intermittently turned by said timing belt, and a rotational filmstrip driving sprocket operably connected to said rotor and located in said second filmstrip annular track to engage and advance the separated filmstrip turn intermittently.

References Cited

UNITED STATES PATENTS

| 3,033,077 | 5/1962 | Schwartz et al. | 88—28 |
| 3,206,757 | 9/1965 | Schrader | 352—72 |
| 3,278,252 | 10/1966 | Wagner et al. | 352—72 |

FOREIGN PATENTS

| 1,124,348 | 2/1962 | Germany. |
| 1,359,359 | 3/1964 | France. |

NORTON ANSHER, *Primary Examiner.*

RICHARD M. SHEER, *Assistant Examiner.*